United States Patent Office 3,238,277
Patented Mar. 1, 1966

3,238,277
ETHER AMINE SALTS OF PENTA-VALENT ORGANO PHOSPHORUS ACIDS
Jack W. Sigan, Minneapolis, Minn., and Tai S. Chao, Homewood, Ill., assignors to Archer-Daniels-Midland Company, Minneapolis, Minn., a corporation of Delaware
No Drawing. Continuation of application Ser. No. 860,106, Dec. 17, 1959. This application Aug. 4, 1964, Ser. No. 387,494
9 Claims. (Cl. 260—925)

This application is a continuation of Serial No. 860,106, filed December 17, 1959, now abandoned.

This invention relates to ether amine salts of the organo acids of the elements of Group VA, their method of preparation, compositions prepared therewith and uses. More particularly, this invention preferably relates to ether amine salts of organo phosphorus acids or aliphatic ether amine salts of aliphatic acid phosphates, more explicitly definable as alkyl ether amine salts of alkyl phosphorus acids and especially alkyl ether amine salts of acidic phosphate esters, their method of production and uses particularly as surface active, anti-static and anti-corrosion agents, including use as de-icing additives for gasoline and fuels, and in lubricants.

The invention will be better illustrated by demonstrating and illustrating the new and novel organo ether amine phosphorus compounds as the preferred embodiment of this disclosure and represented by the general formula, as follows:

(I)
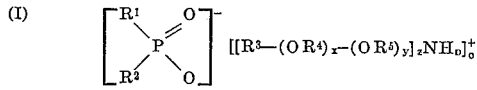

where:

$R^1$ is a substituted or unsubstituted normal or branch chain alkyl, aryl, alkaryl, cycloalkyl, or heterocycloalkyl group, such as methyl, ethyl, n-butyl, isoamyl, cyclohexyl, isoheptyl, isooctyl, isononyl, lauryl, tetrahydrofurfuryl, phenyl, octylphenyl including halogenated alkyl, aryl, alkaryl compounds of the character of chlorophenyl, chloromethyl, and the like; a substituted and unsubstituted normal or branch chain alkoxy, aryloxy, cycloalkoxy, or heterocycloalkoxy group such as methoxy, n-butoxy, isoamoxy, n-hexoxy, isoheptoxy, isooctoxy, tetrahydrofurfuroxy, phenoxy, octylphenoxy, chlorophenoxy, isodecoxy, and the like in which the total number of carbon atoms do not exceed 26 and is preferably 1 to 18;

$R^2$ is the same or a different group selected from $R^1$ above or $O^-$;

$R^3$ is alkyl, aryl, cycloalkyl groups of 1–22 carbon atoms such as methyl, ethyl, isopropyl, n-butyl, n-hexyl, cyclohexyl, 2-ethylhexyl, octyl, stearyl, behenyl, etc.;

$R^4$ and $R^5$ are the same or different divalent alkylene groups of 1–6 carbon atoms such as methylene, ethylene, propylene, butylene, isopropylene, etc.;

$z$ is a small whole number, including 1 to 3;
$b$ is equal to $4-z$;
$c$ is a small whole number, including 1 or 2;
$x$ is a whole number, including 0 to 20, and
$y$ is a whole number, including 1 to 5.

In general, it may be stated that the ether amine component may be an aliphatic, aromatic, substituted aliphatic or substituted aromatic ether amine containing 1 to 25 or more ether oxygen atoms in the molecule. Such compounds can be represented by the general formula:

(II)     $[R^3—(OR^4)_x—(OR^5)_y]_zNH_{b-1}$ where $R^3$, $R^4$, $R^5$, $z$, $b$, $x$ and $y$ are as described above.

An illustrative example of a preferred ether amine is 3-(2-ethylhexoxy)-n-propylamine, which will hereinafter be referred to as 2-ethylhexyl ether amine; its structure can be represented as follows:

(III)
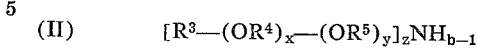

Other suitable but non-limiting ether amines include isopropoxy-n-propylamine, n-butoxy-n-propylamine, isobutoxy-n-propylamine, amyloxy-n-propylamine, n-hexoxy-n-propylamine, isooctoxy-n-propylamine, ethoxy-ethoxy-n-propylamine, butoxy-ethoxyethoxy-n-propyl amine, ethoxyethoxy-ethoxy-n-propylamine, phenoxy-n-propylamine, octylphenoxy-n-propylamine, cyclohexoxy-n-propylamine, tetrahydrofurfuroxy-n-propylamine, the ether amines derived from 1–20 ethylene oxide adducts of $C_4$–$C_{20}$ alcohols, and the like. Other ether amines are those of the character provided in the patent of R. J. Stenberg, U.S. 2,983,738, providing amine derivatives of propionitrile products having the general structure:

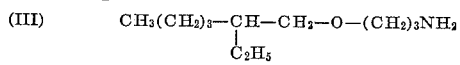

where $R^6$ is $R^3$ above, $R^7$ is $R^4$ or $R^5$ and $n$ may be from 1 to 30.

In general, many of the ether amines can be conveniently prepared through the known methods of cyanoethylation of alcohols, ether alcohols (such as Cellosolves and Carbitols), phenols, ether phenols, and the like, followed by hydrogenation of the resulting ether nitriles. The reactions involved can be illustrated by the following:

(IV)
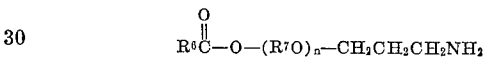

(V)
$R^3(OR^4)_x$—$OCH_2CH_2CN + 2H_2$  $R^3(OR^4)_x$—$OCH_2CH_2CH_2NH$ Catalyst Secondary ether amines (those in which $z$ is 2 and $b$ is 2 in II above) are usually obtained as a by-product in the production of the above primary amines. They can also be prepared from the primary ether amines by disproportionation, as represented by the following equation:

(VI)
$2R^3(OR^4)_x$—$O(CH_2)_3NH_2$  $[R^3(OR^4)_x$—$O(CH_2)_3$—$]_2NH+NH_3$ heat where $R^3$, $R^4$ and $x$ are as previously defined.

Tertiary ether amines (those in which $z$ is 3 and $b$ is 1) can be prepared from primary and secondary ether amines by known methods of alkylation. For example:

(VII)

$[R^3(OR^4)_x$—$O(CH_2)_3]_2NH+R^3(OR^4)_x$
—$O(CH_2)_3Cl \rightarrow [(R^3OR^4)_x$—$O(CH_2)_3]_3N+HCl$ or from ether alcohols by reductive alkylation, as follows:

(VIII)

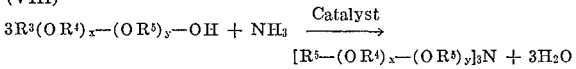

$$3R^3(OR^4)_x{-}(OR^5)_y{-}OH + NH_3 \xrightarrow{\text{Catalyst}}$$
$$[R^5{-}(OR^4)_x{-}(OR^5)_y]_3N + 3H_2O$$

The symbols are as herein defined and described.

The acidic organic compounds of Group VA which can be used for the preparation of the ether amine salts, as described, are represented by the following general formula:

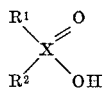

where:
$R^1$ is the same as previously defined,
$R^2$ is a group from these represented by $R^1$ or OH,
X is an element of Group VA of the Periodic Table, i.e., phosphorus, arsenic, antimony and bismuth and preferably phosphorus.

The above is intended to include the acid esters of orthophosphoric acid, phosphorus acid, phosphonic acid, and phosphinic acid, many of which are commercially available or can be produced by methods known to the art. A referred class of acidic organophosphorus compounds are the acid esters of ortho-phosphoric acid. This particularly includes the mixture of mono- and di-substituted phosphates obtained from the reaction of phosphorus pentoxide and an alcohol, such as isobutyl, mixed amyl, n-hexyl, isooctyl, n-octyl, mixed n-octyl-n-decyl, oxo decyl, lauryl, tridecyl and similar alcohols. The method of preparation of such phosphates is known to the art. The use of the mixture of mono- and dialkyl phosphates instead of mere dialkyl phosphates, prepared by methods known to the art, has many advantages. Besides being more readily prepared and available at a lower cost, the mixed mono-di-alkyl phosphates have higher acid value than dialkyl phosphates, and consequently allow incorporation of more ether amine into the molecule whenever desired. They also give salts of lower pour point than similar derivatives of dialkyl phosphates, and provide other desirable physical properties in conjunction with economical production and commercial usage.

Accordingly, it will be recognized that it is an object of this invention to provide the art with ether amine salts of organophosphorus compounds and substitute other organo acid salts of arsenic, antimony and bismuth of recognizable chemical equivalence in reaction, as herein described and the method of preparing the same.

A further object of this disclosure is to provide the art with prepared reactants and a method for their preparation including in addition the method for producing ether amine salts of organophosphorus acids therefrom.

Another object of this disclosure is to provide the art with novel ether amine salts of an organic phosphate as antistatic and rust inhibiting agents providing economic advantages and serving as improved lubricant and fuel additives in addition to being useful in the formulation of other compositions and products.

To the accomplishment of the foregoing and related ends, this invention and improvement in the art then comprises the features herein described and more particularly illustrated by typical examples, recognizable to those skilled in the art. The following description sets forth in detail certain illustrative and exemplary embodiments of the invention, these being indicative, however, of but a few of the varous ways in which the compounds of this invention and improvement in the art may be made and employed.

Illustrative but non-limiting examples to exemplify the preparation of alkyl derivatives of phosphonic acids, as reactants for producing the ether amine salts of this invention, are shown, as follows:

EXAMPLE I

A 5 liter, 3-necked flask was equipped with a stainless steel stirrer, a thermometer, a nitrogen inlet, and an 18 inch glass helices-packed column. The latter was fitted with a variable take-off column head and a reflux condenser. A mixture of 1,767 gms. lauryl bromide and 1,219 gms. triethyl phosphite was placed in the flask and heated to 150 C., with stirring. At this temperature ethyl bromide started to distill over. The distillation of ethyl bromide continued for a period of 11 hours during which the pot temperature rose gradually to 235° C. Towards the end of the reaction period nitrogen gas was bubbled through the reaction mixture to facilitate the removal of ethyl bromide. A total of 743 gms. ethyl bromide was obtained. The residue was distilled under vacuum to remove 215 grams of excess triethyl phosphite and its isomerization product, namely, di-ethyl ethanephosphonate. There was obtained 1,974 gms. (92.4% yield) of crude undistilled di-ethyl lauryl phosphonate. Theoretical phosphorus 9.62%; determined, 9.20%. This and similar phosphonates can be purified by vacuum distillation, if desired. However, the crude products are satisfactory for use as illustrated by the following example.

EXAMPLE II

To prepare a mono-ethyl lauryl acid phosphonate, the di-ethyl phosphonate ester, described in Example I, was saponified with a 0.8 N solution of potassium hydroxide in diethylene glycol. 960 gms. of the diethyl ester was heated at 142–162° C. for 15 hours with 2500 ml. of the KOH solution. The reaction mixture was then acidified with dilute $H_2SO_4$ and the acid ester was taken up in methyl iso-butyl ketone. After repeated washing with salt water and water, the solution was placed under vacuum and the solvent removed. The residue was a light-brown colored liquid weighing 758 gms. The yield was 86.6%. Analysis showed 8.8% phosphorus and acid value 148. This crude product was utilized satisfactorily for preparation of the ether amine salts of this disclosure. Likewise, comparable analogous aliphatic phosphonates may be prepared as reactants for forming the ether amine salts, as indicated.

EXAMPLE III

To prepare a dibasic lauryl phosphonic acid, the di-ethyl ester from Example I (800 gms.) was refluxed with 2,050 ml. of concentrated HCl for 15 hours. The hot reaction mixture was transferred to a separatory funnel from which the lower aqueous layer was removed. The upper layer was diluted with ether, washed with water, dried, and the solvent was removed under vacuum. There was obtained 593 gms. (90.1% yield) of a white, wax-like solid which showed the following analysis: phosphorus 9.31% and acid value 343. This solid was used to form an ether amine salt as herein described.

The following examples are illustrative of using the above type reactants and the new and useful compounds provided therewith by this disclosure. Essentially, the novel ether amine salts of an organic phosphate can be prepared.

The novel ether amine salts of an organic phosphorus acid can be prepared by neutralization of the respective phosphorus acid with approximately stoichiometric proportions of an ether amine of the class described herein. In most instances, it is advantageous that the pH of the reaction mixture be adjusted to substantially neutral, i.e., between about 5.5 and about 7.5, by controlling the amount of ether amine introduced into the reaction. In the case of ether amines that are very weak bases, however, a lower pH, for example of the order of 3.0 or 3.5 is satisfactory.

EXAMPLE IV 350 grams of mixed mono- and dialkyl phosphates, prepared from a commercial grade mixture of $C_8$ to and including $C_{12}$ fatty alcohols, was placed in a 1 liter, 3 necked flasked equipped with a stainless steel stirrer, a reflux condenser and a nitrogen gas inlet. With constant stirring and cooling with a water bath, 280 grams of an ether amine (2-ethyl-hexoxypropyl amine) was added from a dropping funnel during the course of 15 minutes. A maximum temperature of 61° C. was observed. The product was a viscous liquid soluble in kerosene and gasoline in all proportions. It showed a pH of 7.2 and a light yellow color. It analyzed 5.62% phosphorus and 3.20% nitrogen.

EXAMPLE V 350 grams of isoctyl phosphate prepared by a known method from a commercially available grade of isoctyl alcohol was neutralized and reacted in the manner of Example IV with 342 grams of crude 2-ethylhexoxy-n-propyl ether amine. The product was a light orange colored liquid having a pH of 7.2. It showed the following analysis: 6.14% phosphorus and 3.52% nitrogen. A similar run with a distilled sample of the same ether amine gave a colorless product having an equivalent analysis. This product is an ether amine salt of isoctyl phosphate, named 3-(2-ethylhexoxy)-n-propylamine isooctyl phosphate; the preparation is essentially a mixture of the ether amine salts of mono- and dialkyl phosphates.

EXAMPLE VI

An illustration of the preparation of an alkyl ether amine salt of an acidic organophosphorus compound prepared by other than the phosphate above is provided by neutralizing 10 grams of crude mono-ethyl lauryl acid phosphonate (Example II) with 5.5 grams of ether amine (2-ethylhexoxypropyl amine) in a 150 ml. beaker. The salt obtained was a light yellow clear liquid, soluble in gasoline, kerosene and lubricants and under the severe conditions of test, was found to be an excellent corrosion inhibitor (see Example XIV).

EXAMPLE VII

While the above examples show how an ether amine, such as 2-ethylhexoxy propyl amine, was used in this invention, other ether amines can be used to form the solvent soluble corrosion inhibiting salts embodied herein. For example, Table 1 shows a series of ether amine salts of isooctyl phosphate which were prepared and the essential conditions of preparation. In each of these 40 g. of a 70% solution of isooctyl phosphate in mineral spirits was placed in a tared container and a calculated amount of ether amine was added. The calculation was based on the following equation and our previous finding that roughly 70% of the amine equivalent to the second acid value (thymolphthalein end point) of the phosphate was sufficient to bring the pH of the salt in the range of 6.9–7.1, for the condition of reaction.

$$W_A = \frac{0.7 W_P \, (A.V.) \, M}{56{,}108}$$

where $W_A$ = grams of ether amine required
$W_P$ = grams of mixed mono-di-alkyl phosphate used
A.V. = acid value of the phosphate, in number of milligrams of potassium hydroxide required to neutralize one gram of the phosphate to thymolphthalein end point
M = molecular weight of the ether amine In the present example $W_P$ is 40, A.V. is 225 and, hence, $W_A$ is equal to 0.112 M. Since the actual amount of ether amine required depends both on the quality of the amine and the exact shape of the neutralization curve of individual compound, slightly less than this amount, namely 0.10 M of the individual ether amine, was used at first. The phosphate and the amine were warmed and stirred until a homogeneous product was obtained. The pH of this product was measured and then additional amounts of ether amine were added until a pH of 6.9–7.1 was attained.

*Table 1*

PREPARATION OF ETHER AMINE SALTS OF ISOOCTYL PHOSPHATES

| Ether Amine Used | Formula | M | $W_a$, Grams Start | $W_a$, Grams Total | pH |
|---|---|---|---|---|---|
| Name: | | | | | |
| Isopropyl-ether amine | i-$C_3H_7OC_3H_6NH_2$ | 117 | 11.7 | 11.9 | 6.9 |
| n-Butyl ether amine | n-$C_4H_9OC_3H_6NH_2$ | 131 | 13.1 | 13.7 | 6.9 |
| Isobutyl ether amine | i-$C_4H_9OC_3H_6NH_2$ | 131 | 13.1 | 13.7 | 6.9 |
| Mixed amyl ether amine | $C_5H_{11}OC_3H_6NH_2$ | 145 | 14.5 | 16.0 | 7.0 |
| n-Hexyl ether amine | n-$C_6H_{13}OC_3H_6NH_2$ | 159 | 15.9 | 18.3 | 6.9 |
| Isooctyl ether amine | i-$C_8H_{17}OC_3H_6NH_2$ | 187 | 18.7 | 19.6 | 6.9 |
| Oxo decyl ether amine | i-$C_{10}H_{21}OC_3H_6NH_2$ | 215 | 21.5 | 22.8 | 7.0 |
| Tridecyl ether amine | i-$C_{13}H_{27}OC_3H_6NH_2$ | 257 | 25.7 | 26.1 | 6.9 |
| Butyl Cellosolve ether amine | n-$C_4H_9OC_2H_4OC_3H_6NH_2$ | 175 | 17.5 | 18.7 | 7.0 |
| Butyl Carbitol ether amine | n-$C_4H_9O(C_2H_4O)_2C_3H_6NH_2$ | 219 | 21.9 | 24.1 | 7.0 |

These salts were pale yellow clear liquids and soluble in gasoline, kerosene, mineral oil and other hydrocarbon solvents.

In addition to preparing many of these ether amine salts in solvent solutions, suitable ether amines and alkyl phosphates can be reacted in the absence of solvent, as variously indicated herein and shown in the following example:

EXAMPLE VIII

The lauryl ether amine (n-$C_{12}H_{25}OC_3H_6NH_2$) salt of isooctyl phosphate was prepared in the absence of a solvent. This ether amine salt is similarly soluble in gasoline, kerosene, mineral oil and other solvents and effective as a corrosion inhibitor. Heating to 116° C. was required to obtain a clear homogeneous reaction mixture, but the neutralized salt was a clear liquid at room temperature. The addition of about 22.4 grams of the ether amine was required for substantially neutralizing and reacting with 20 grams of isooctyl phosphates to a pH of between about 5.5 and 7.5.

EXAMPLE IX

To illustrate that secondary ether amines are also useful in the preparation of gasoline additives, corrosion inhibitors, the bis(2-ethyl-hexoxypropyl) amine salt of isooctyl phosphates was prepared as follows:

Fifteen grams of bis(2-ethylhexoxypropyl) amine, isolated as a by-product in the preparation of 2-ethylhexoxypropyl amine, was neutralized with 10.9 g. of isooctyl phosphate. The product was an orange-red colored viscous oil, soluble in kerosene, gasoline and other hydrocarbon solvents. Its effectiveness as corrosion inhibitor in isooctane will be shown in Example XIII.

As indicated, the preparation of ether amine salts can be conducted with or without the use of a solevnt, in a recognized manner. However, it is sometimes preferable and more convenient to use a suitable solvent, such as kerosene, another suitable hydrocarbon solvent, or a suitable alcohol solvent. The use of a suitable solvent will facilitate stirring and cooling of the reaction mixture and the subsequent handling and application of the product. In the event that the product is used as a gasoline additive, the product can be prepared and used directly as a concentrated kerosene or other suitable solvent solution. For lubricant application, mineral oil is the preferred solvent for conducting the reaction. Some additional examples will illustrate the preparation of the ether amine phosphate salts with selective solvents for particular end uses, as follows:

EXAMPLE X

Four hundred grams of a 68% by weight solution of isooctyl phosphates in mineral spirits was placed in a 1 liter, 3-necked flask equipped with a stirrer, a reflux condenser and a dropping funnel. With stirring and passage of nitrogen, 251 g. of an ether amine (2-ethylhexyl propyl amine) was added during the course of 22 minutes. The product showed a pH of 7.4. Fifty grams of the phosphate solution was then added to bring the pH to 7.0. The product was a light yellow clear liquid, giving the following analysis: 5.33% phosphorous and 2.53% nitrogen. The ether amine salt can be used directly, without removing the solvent, as an oil, fuel or gasoline additive, inasmuch as the presence of the small amount of mineral spirits will not materially affect the performance of the oil, gasoline or fuel.

EXAMPLE XI 23 grams of lauryl phosphonic acid in solution in 8 grams of kerosene was neutralized in a 100 ml. beaker with 16.4 grams of 2-ethylhexoxy-n-propylamine. The product was a light yellow liquid of pH 7.05. It was diluted with more kerosene to form an 80% by weight solution and used as a corrosion inhibiting additive for gasoline.

In preparing the phosphate salts, under the conditions of reaction indicated, the ether amines are interchangeable and substituted in the described reactions to obtain desired final physical properties e.g., the shorter chains for water solubility and the longer chains for oil solubility. These ether amine salts e.g. are derived in a similar manner utilizing e.g. butyl ether amine or lauryl ether amine and the like and with organophosphorus acids other than acid phosphates i.e. acid phosphonates and phosphinates, by a process as described. Examples illustrative of our novel ether amine salts of alkyl acid phosphates having beneficial corrosion-inhibiting properties are hereinafter provided.

As shown in the above examples, crude as well as purified ether amines can be used in the preparation of organophosphorus salts of this invention and utilized in the manner shown in the test examples for practical application. The color and clarity of the product depends naturally on the quality of the amine as well as of the phosphate used. However, it is a discovery of this invention that light colored amine salts can often be prepared from dark colored phosphates, provided that a purified ether amine is used. It appears that the color-causing impurities in the acidic phosphates became lighter colored upon neutralization in the reaction.

In commercial production where crude ether amine is used, the color of the salt product can often be improved if necessary by decolorization with a suitable decolorization agent such as Filtrol, Darco or Nuchar, as shown in the following example.

EXAMPLE XII

About 50 grams of the orange-colored 2-ethylhexyl ether amine salt of isooctyl phosphates was heated for 30 minutes on a steam bath with 5 g. of an activated carbon bleaching agent, 10 g. of a commercial filter aid and 150 ml. of hexane. The mixture was suction filtered through a Büchner funnel and the filtrate was evaporated under vacuum. A light yellow colored viscous liquid was obtained when all the solvent was removed. Otherwise, the solvent solutions of the prepared salts may be filtered through suitable commercially available solid adsorbents such as Filtrol, Hyflo Super-Cel, silica gel, etc.

The following are illustrative of test samples and manner of use in practical applications of the preferred ether amine salts.

EXAMPLE XIII 0.3570 gram of the 2-ethyl hexyl either amine salt of isooctyl phosphate (Example V) was stirred into 250 milliliters of a commercial gasoline containing no corrosion inhibitor. The mixture was stirred until a clear solution was obtained. Three milliliters of this solution was then diluted to 500 milliliters with the same gasoline. This represents a gasoline containing 0.00856 gram per liter of the amine salt and is equivalent to the presence of 3 lbs. of this active ingredient in 1000 barrels of gasoline. Corrosion tests according to ASTM method D665-54 showed the absence of any rust after 20 hrs. at 100° F. in synthetic seat water. Control samples under the same conditions of test were heavily rusted. The same effectiveness was observed with the bis(2-ethylhexoxy propyl) amine salt of isooctyl phosphate prepared in Example IX.

EXAMPLE XIV

The same test has been conducted for a number of other compounds disclosed in this invention, using depolarized isooctane as solvent. The results for a series of ether amine salts of isooctyl phosphates are shown in the following table.

Table 2

| Ether amine used in the preparation of salt exemplified by isooctyl phosphate | Concentration, lbs./1,000 bbl. | Percent rust in synthetic sea water |
|---|---|---|
| i-Propyl ether amine | 1.6 | 0 |
| n-Butyl ether amine | 1.6 | 0 |
| i-Butyl ether amine | 2.0 | 0 |
| Mixed amyl ether amine | 2.0 | 10 |
| n-Hexyl ether amine | 2.8 | 0 |
| i-Octyl ether amine | 2.0 | 10 |
| Oxo decyl ether amine | 2.4 | 0 |
| Tridecyl ether amine | 2.8 | 10 |
| Butyl Cellosolve ether amine | 2.4 | 0 |
| Butyl Carbitol ether amine | 2.8 | 0 |

Test method ASTM method D665-54, modified according to military specification MIL-25017 (ASG) and its amendment-1.

EXAMPLE XV

This example illustrates that ether amine salts of organophosphorus acids other than the exemplary alkyl phosphates are also effective corrosion inhibitors for oils, gasolines and fuels. A sample of the 2-ethylhexyl ether amine salt of monoethyl lauryl phosphonate (Example VI) was diluted with one fourth of its weight of kerosene to give an 80% solution. 0.3570 gram of the kerosene solution was dissolved in 250 ml. of depolarized isooctane to provide a stock solution. Three milliliters of the stock solution was diluted with the isooctane to 500 ml. to prepare a test solution. 300 ml. of this test test solution was used in the ASTM D665-54 test for corrosion inhibitors, using 30 ml. synthetic sea water. The concentration of the active ingredient was thus 0.00685 gram per liter, equivalent to 2.4 lbs. per 1000 bbl. of isooctane. After 20 hours at 100± 2° F., the test specimen showed the complete absence of rust and corrosion. The control sample was badly rusted.

EXAMPLE XVI

This example illustrates the effectiveness of the ether amine salts of this invention as corrosion inhibitor in mineral oil compositions. 0.1428 gram of the 2-ethylhexyl ether amine salt of isooctyl phosphate was dissolved in 100 milliliters of light white mineral oil. Five milliliters of this solution was diluted to 500 ml. with the same mineral oil. Two hundred fifty milliliters of this diluted solution was used in the ASTM D665–54 test for rust inhibition. After 20 hrs. at 140° ±2° F. in the presence of 25 ml. of distilled water, the test specimen showed the complete absence of rust or corrosion.

The prepared illustrated compounds were soluble and compatible with gasoline, kerosene, suitable alcohols and hydrocarbon solvents, fuel oils, lubricating oils and greases and may be mixed therewith in desired proportions for beneficial advantage without detriment to the mixture. As indicated above these ether amine salts are effective at a level of about 1.6 to 3 pounds in 1000 bbl. of gasoline. Relatively larger and smaller proportions of the herein described ether amine salts of organic acid phosphorus compounds can be mixed with gasoline, fuels and lubricants with beneficial results. In lubricants about 0.01% to 20% of the ether amine salts may be used and in gasoline about 0.5 to 20 pounds per 1000 bbl. may be used. In addition to their being additative to lubricants, including mineral oils, synthetic lubricants, lubricating greases, cutting oils, and metal working lubricants, the said salts may be utilized in solutions or dispersions as lubricants, surfactants, dispersants, anti-oxidants, an additive to drilling muds, oil flow lines and the like, and as anti-water and extreme pressure additives. In general the products herein described when added in small amounts of about 0.1 to 10% to oils and oil well sealing fluids aid in earth penetration and absorbency for oil storage.

Another valuable property of the ether amine salts of this invention is their ability to dissipate static electricity from surfaces of hydrophobic materials. This includes hydrophobic textile fibers such as nylon, Acrilon, Orlon, etc., and other shaped articles made of hydrophobic polymers. The following example demonstrates its effectiveness as an antistatic agent for vinyl floor tile.

EXAMPLE XVII

A cigarette ash test was set up according to the method described by U.S. Patent No. 2,778,748 with a few modifications. A 3" x 8" piece of glass plate was placed horizontally over two ½ pint glass jars. A thin layer of fresh cigarette ash was spread on the glass and a scale was placed behind the glass plate for measuring the vertical distance above the glass surface. A 1½" x 3" strip cut from a vinyl floor tile was placed on several layers of paper and rubbed vigorously for about 20 strokes with a clean paper towel. The tile strip was immediately placed over the cigarette ash with the rubbed surface facing the ash. The tile strip was gradually lowered until the ash began to be attracted by the tile and the distance between the tile and the glass surface was measured. With untreated vinyl tile the distance was 2–3 cm., depending upon relative humidity of the room.

Identical tile strips were then treated with the ether amine salts of this invention. The simplest method was to place a few drops of a mineral spirits solution containing 80% of the salts of Example VII on the tile, spread it evenly over the tile surface with a paper towel and wipe off the excess. After drying at room temperature for about an hour the strip was tested in the same manner as done with the untreated tile. The tile can now be lowered into direct contact with the ashes without attracting them. This has been done for a number of ether amines shown in Table 1 and complete de-statification was observed for those in which $R_3$ is isopropyl, isobutyl, butyl Cellosolve and butyl Carbitol, while the others showed lower but significant effects.

Although mineral spirits were used in the above example, other solvents, vehicles and pigmented and varnish vehicles can be used as well. Suitable solvents include aliphatic, cycloaliphatic and aromatic hydrocarbons, alcohols, aqueous emulsions, halogenated hydrocarbons, ketones and esters. The solution can be applied by wiping, brushing, spraying, dipping or other suitable means of applying antistatic agents to the surface of materials which are known to the art. The concentration of the solutions can vary from 0.5 to 50% by weight.

The ether amine salts of this invention are also useful as solubilizing agents for metal salts in mineral oil. For example, a zinc salt of a $P_2S_5$ addition product to an unsaturated fatty material or olefin which is insoluble in mineral oil can be solubilized with the addition of a minor amount, such as 25% by weight of the zinc salt, of the 2-ethylhexyl ether amine salt of isooctyl phosphate.

A selective group of the ether amine salts of alkyl acid phosphates, having 4–12 carbon atoms in the alkyl chains are also useful as de-icing or anti-stalling additives to gasolines and fuels. In such an application the alkyl amine salts described show unexpected and superior de-icing or anti-stalling efficiency over other known available commercial materials. These salts also exhibit advantageous pour point, water tolerance solubility and stability characteristics. They are also economically favorable on a cost basis.

The effectiveness of the ether amine salts of alkyl acid phosphates in mineral oil systems shows the use of these compounds as corrosion inhibitors in mineral lubricating oils, industrial lubricants, hydraulic fluids, cutting oils, metal working lubricants, in oil-water emulsion systems such as soluble oils, fire-retardant hydraulic fluids, and in automobile cooling systems in which a small amount of mineral oil composition is often used in combat corrosion. The addition of a small portion of the ether amine salts, e.g., 0.001% to 10% aids in preventing corrosion. In concentrated solution in petroleum solvents the pour points are from 10 to about 20° F. lower than known commercial products.

Many of the ether amine salts specified in this disclosure are also compatible with polymers and resins. For example, the 2-ethylhexyl ether amine salt of isooctyl phosphate was found to be soluble in an alkyd resin at a level of 20% by weight. Also being in mineral spirits and other paint and lacquer solvents the use as corrosion inhibitor in paint systems, such as in alkyd house paints, water-thinned paints, lacquers, enamels, in printing inks and similar systems.

The ether amine salts of this invention are also useful as surfactants which include liquid detergents, degreasing agents in solvents, dry cleaning detergents, emulsifying agents and wetting agents, as textile lubricants, softeners and conditioning agents, and as herbicidal, fungicidal and insecticidal agents.

Being soluble in mineral spirits and certain other hydrocarbon paint and lacquer solvents, the ether amine salts are also useful in resinous paint, lacquer and enamel vehicles at levels of from about 0.1–10%, as corrosion inhibiting agents.

It is apparent that many modifications and variations of this invention as hereinbefore set forth may be made without departing from the spirit and scope thereof. The specific embodiments described are given by way of example only and invention is limited only by the terms of the appended claims.

What is claimed is:

1. Alkyl ether amine salts of (1) a mixture of at least one monoalkyl-substituted ortho-phosphoric acid and at least one dialkyl-substituted ortho-phosphoric acid wherein each alkyl substituent group of said ortho-phosphoric acids contains 1–26 carbon atoms, said ortho-phosphoric acids being otherwise unsubstituted, and (2) an alkyl ether amine having the formula:

$$[R^3-(OR^4)_x-(OR^5)_y]_zNH_{3-z}$$

wherein $R^3$ is an alkyl group of 1–22 carbon atoms, each of $R^4$ and $R^5$ is a divalent alkylene group of 1–6 carbon atoms, $x$ is an integer from 0–20, $y$ is an integer from 1–5, and $z$ is an integer from 1–3.

2. Alkyl ether amine salts of claim 1 wherein each alkyl substituent group of said ortho-phosphoric acids is isooctyl.

3. Alkyl ether amine salt of claim 1 wherein at least one of said alkyl substituent groups is isooctyl.

4. Alkyl ether amine salt of claim 1 wherein $x$ is zero, $y$ is one, and $z$ is one.

5. 3-(2-ethylhexoxy)-n-propyl amine salt of a mixture of isooctyl ortho-phosphoric acid and diisooctyl ortho-phosphoric acid.

6. 3-(isopropoxy)-n-propylamine salt of a mixture of isooctyl ortho-phosphoric acid and diisooctyl ortho-phosphoric acid.

7. 3-(n-butoxy)-n-propylamine salt of a mixture of isooctyl ortho-phosphoric acid and diisooctyl ortho-phosphoric acid.

8. 3-(isobutoxy)-n-propylamine salt of a mixture of isooctyl ortho-phosphoric acid and diisooctyl ortho-phosphoric acid.

9. 3-(amyloxy)-n-propylamine salt of a mixture of isooctyl ortho-phosphoric acid and diisooctyl ortho-phosphoric acid.

References Cited by the Examiner

UNITED STATES PATENTS 2,508,430   5/1950   Smith et al. _____ 260—455 X

OTHER REFERENCES

Adler et al.: "Chemical Industries," October 1942, pp. 516, 518.

CHARLES B. PARKER, *Primary Examiner.*

FRANK M. SIKORA, DELBERT R. PHILLIPS, *Assistant Examiners.*